No. 732,339. PATENTED JUNE 30, 1903.
E. H. COTTRELL.
MACHINERY FOR CUTTING AND FOLDING PAPER OR OTHER FABRICS.
APPLICATION FILED DEC. 12, 1902.
NO MODEL. 5 SHEETS—SHEET 1.
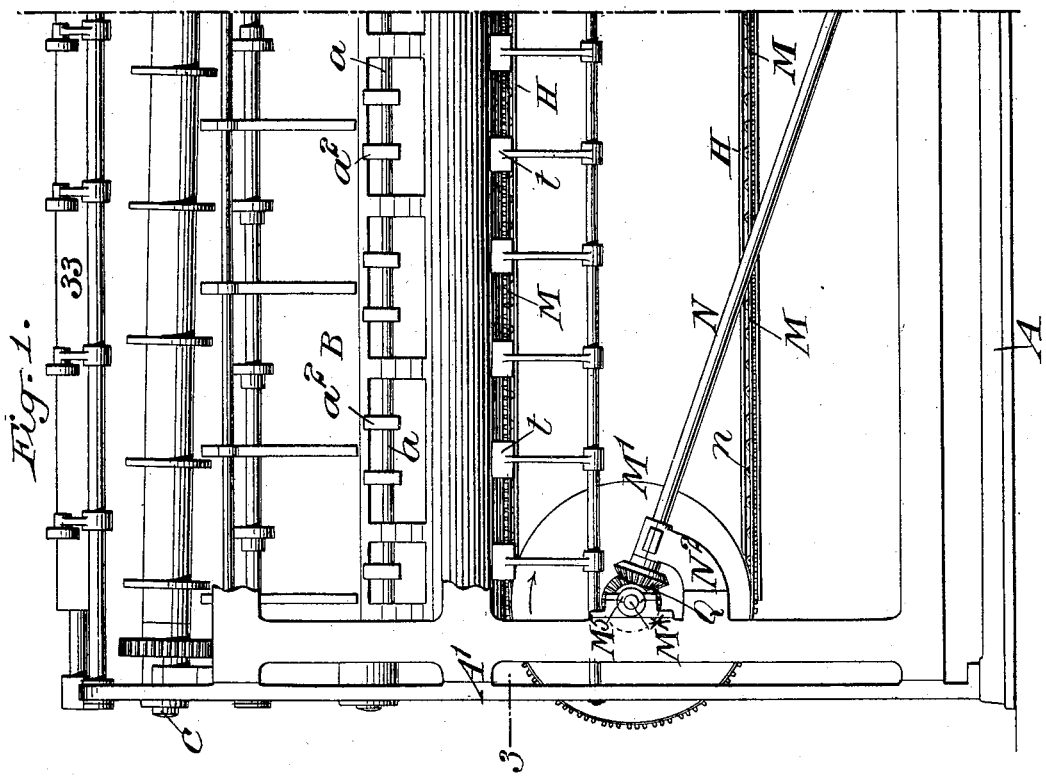
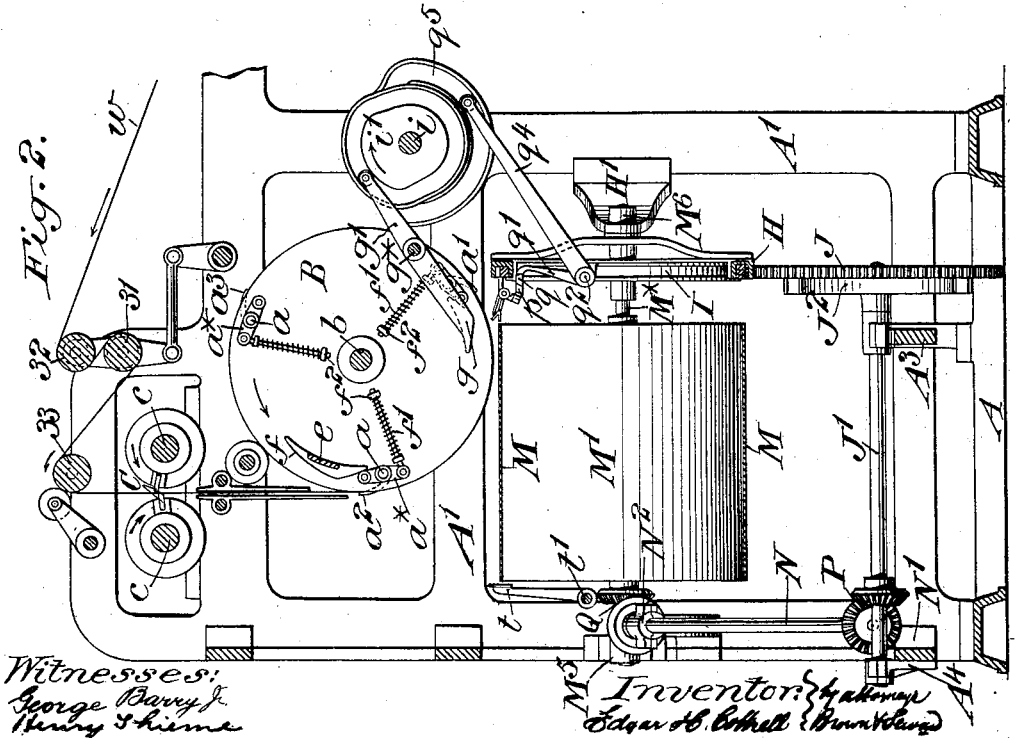

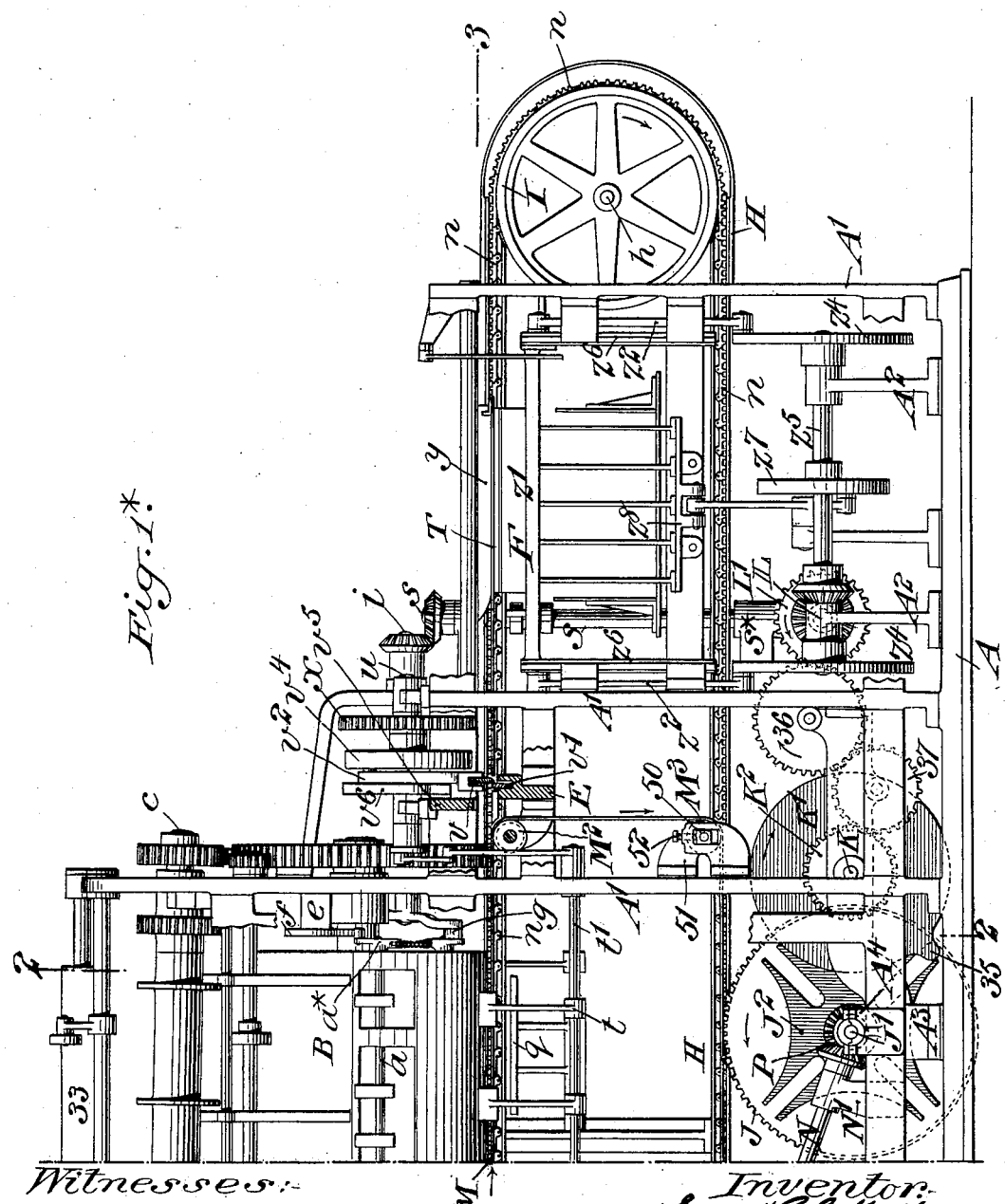

No. 732,339. PATENTED JUNE 30, 1903.
E. H. COTTRELL.
MACHINERY FOR CUTTING AND FOLDING PAPER OR OTHER FABRICS.
APPLICATION FILED DEC. 12, 1902.
NO MODEL. 5 SHEETS—SHEET 3.
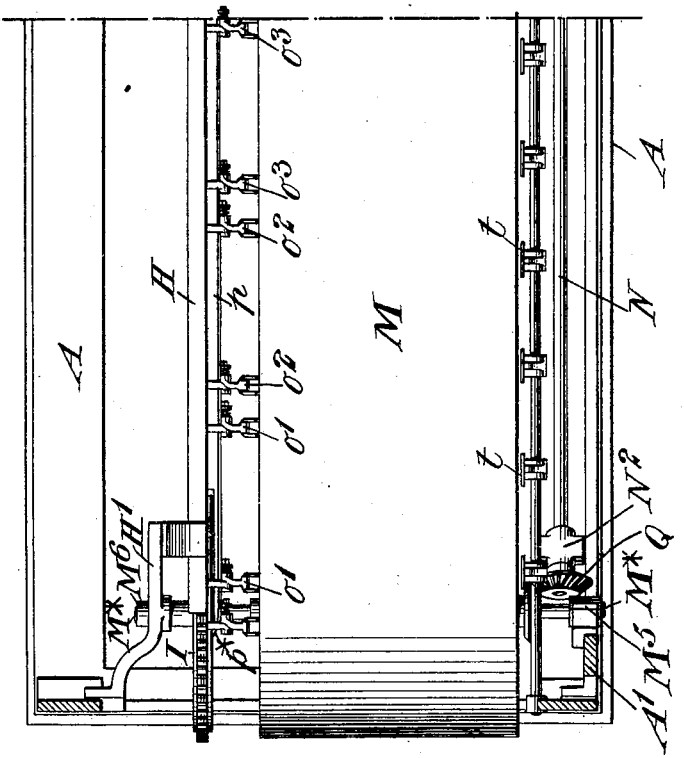
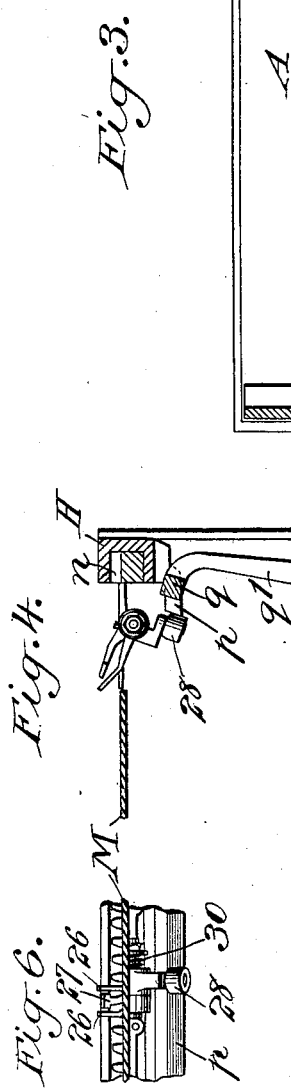
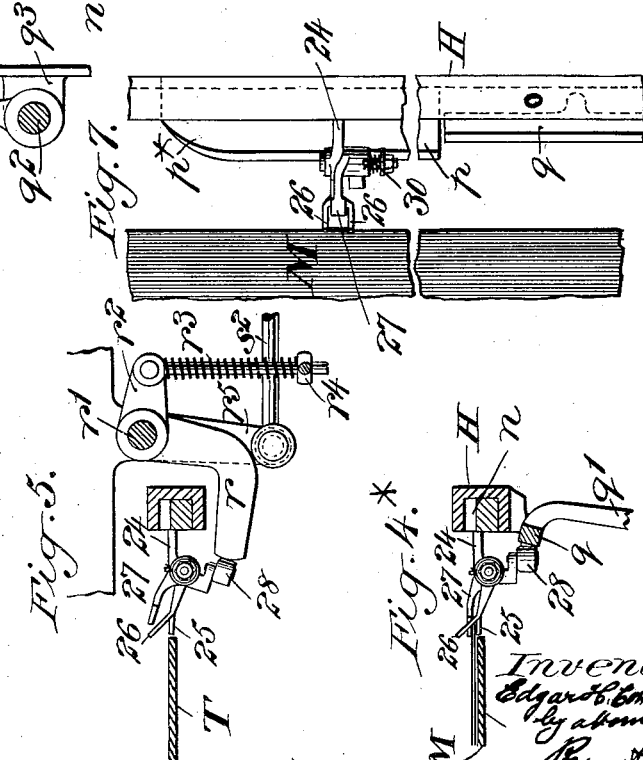
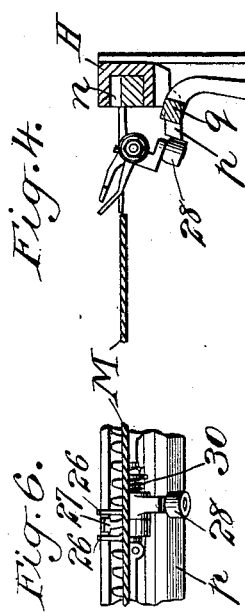
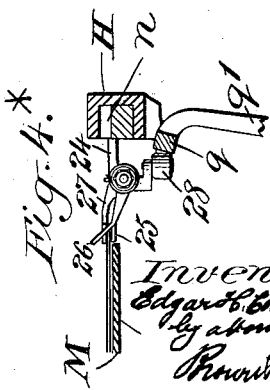

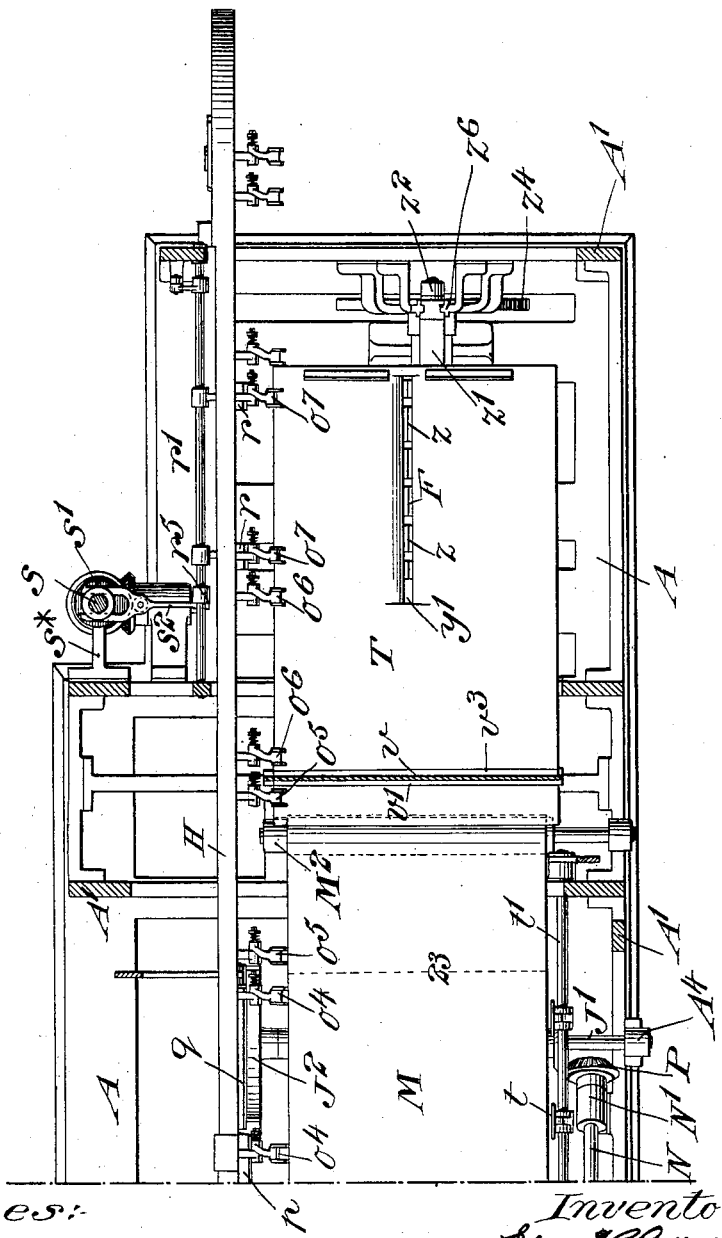

No. 732,339. PATENTED JUNE 30, 1903.
E. H. COTTRELL.
MACHINERY FOR CUTTING AND FOLDING PAPER OR OTHER FABRICS.
APPLICATION FILED DEC. 12, 1902.
NO MODEL. 5 SHEETS—SHEET 5.
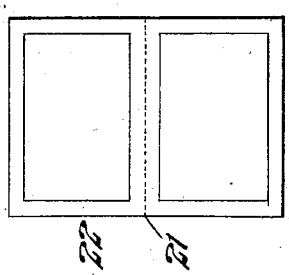
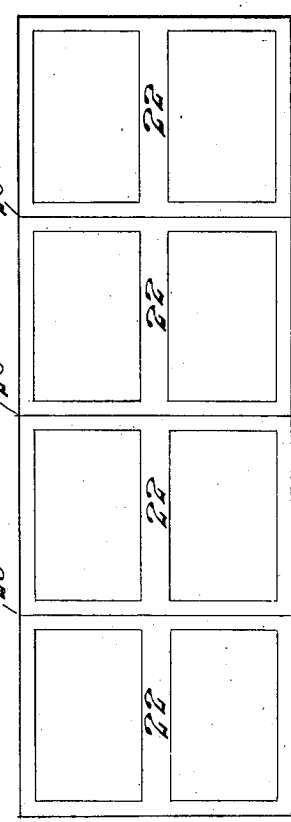
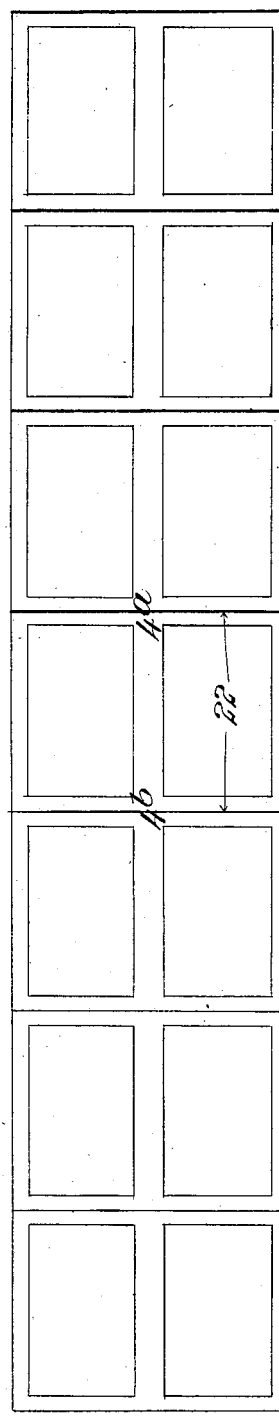
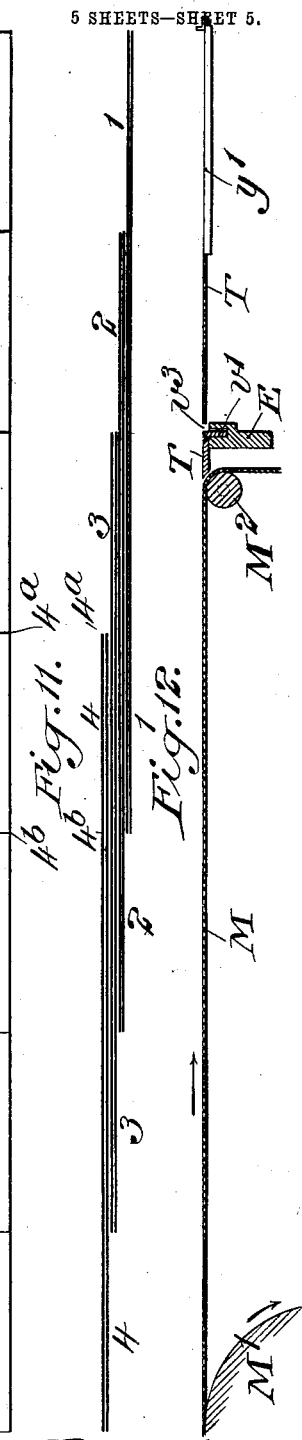
Witnesses:
George Barry Jr.
Henry Thieme
Inventor:
Edgar H. Cottrell
by attorneys No. 732,339. Patented June 30, 1903.

UNITED STATES PATENT OFFICE.

EDGAR H. COTTRELL, OF STONINGTON, CONNECTICUT, ASSIGNOR TO C. B. COTTRELL & SONS COMPANY, OF NEW YORK, N. Y., AND STONINGTON, CONNECTICUT, A CORPORATION OF NEW JERSEY.

MACHINERY FOR CUTTING AND FOLDING PAPER OR OTHER FABRICS.

SPECIFICATION forming part of Letters Patent No. 732,339, dated June 30, 1903.

Application filed December 12, 1902. Serial No. 134,891. (No model.)

*To all whom it may concern:*

Be it known that I, EDGAR H. COTTRELL, a citizen of the United States, and a resident of Stonington, in the county of New London and State of Connecticut, have invented a new and useful Improvement in Machinery for Cutting and Folding Paper or other Fabrics, of which the following is a specification.

The cutting and folding machinery to which this invention relates is more especially intended to be used in connection with printing machinery in which the printing of the several pages necessary for a signature is performed on a continuous web before cutting the latter into sheets.

The invention consists in certain combinations hereinafter described and claimed by which when all are employed together printed sheets which are cut from the web and several of which are required to form one signature are deposited in a train in which several successive deposits partly overlapping each other are presented together to a cutter and thereby cut transversely to their cuts from the web into piles of smaller sheets, which are presented to a folder which by one fold folds all the sheets of a pile together into a signature.

An important feature of the invention, distinguishing it from a prior invention of my own, which is the subject of application Serial No. 124,158 for United States Patent, is the substitution of a moving apron or traveling support for a portion of the stationary table illustrated in said application, on which the sheets are deposited in the train and along which the train is taken by a carrier to the transverse cutter and the pile of shorter sheets is taken to the folder, the said traveling support moving in the same direction and at or nearly at the same speed as the said carrier, and thereby relieving from friction that portion of the train of sheets which is at any time being carried over said support.

In the accompanying drawings, Figures 1 and 1* together represent a front elevation of cutting and folding machinery embodying the invention, the front of the framing being shown partly broken away to expose the working parts to view; Fig. 2, a transverse vertical section in the line 2 2 of Fig. 1*; Figs. 3 and 3*, a horizontal section on the line 3 3 of Figs. 1 and 1*; Figs. 4, 4*, 5, 6, 7, views of some details to be hereinafter explained of the table and carrier on a larger scale than the preceding figures; Fig. 8, a plan view of one of the printed sheets cut from a web and collections of which the example of the invention represented is adapted to cut into smaller sheets and fold; Fig. 9, a plan view of one of the smaller sheets cut from the sheet shown in Fig. 8 and ready for folding with other similar smaller sheets into a signature; Fig. 10, a plan view of a train of such printed sheets, illustrating the order of their passage to the cutter and folder for the production of signatures; Fig. 11, an edge view corresponding with Fig. 10; Fig. 12, a longitudinal section of the upper part of the moving apron and of the short stationary table, which together constitute the support for the whole length of said train and of the cutter interposed between said apron and table.

A is a bed-plate supporting the main framing A', in which are the bearings of the shafts $c$, which carry the rotary blades C C of the cutter for cutting the sheets from the web and in which are the bearings for the shaft $b$ of the cylinder or drum B, hereinafter referred to as the "collecting-cylinder." Directly under this cylinder is the traveling sheet-support M, upon which the sheets are deposited from the collecting-cylinder. This sheet-support is represented as consisting of a horizontal endless apron M, carried by rollers M' M² M³, the shafts of which run in suitable fixed bearings. The width of this support, hereinafter referred to as the "apron," is a trifle less than the length of the portion of the web cut off to produce the sheet in order that the edges of the sheet may overlap the edges of the apron sufficiently to permit one edge to be taken by the grippers $o'$ $o^2$ $o^3$ $o^4$ $o^5$ $o^6$ $o^7$ of an endless sheet-carrier and the other edge to be jogged into said grippers by joggers $t$. The length of the straight upper run of the said apron is so much greater than the length of the collecting-cylinder that in the direction in which said apron runs (indicated by the arrow in Figs. 1* and 12) it extends, as shown in Fig. 1*, some distance beyond the corresponding end of said cylinder. In line with the apron M and in the same plane with its upper run there is suitably supported in the framing A' beyond the end above referred to of the cylinder B the stationary table T, to which the train of sheets deposited on the apron M by the collecting-cylinder B are taken by the grippers of the endless carrier to be thereon cut crosswise of the original cut from the web by the cutter $v\ v'$, hereinafter described, into smaller sheets that while on said table are folded together by the folder F on a line parallel with the original cut, and thus formed into signatures. The carrier, arranged at one side of the apron M and table T, consists of an endless toothed rack $n$, having the grippers $o'\ o^2\ o^3\ o^4\ o^5\ o^6\ o^7$ attached, and is of a length somewhat greater than the united lengths of the apron and table.

The collecting-cylinder B is furnished with grippers $a'\ a^2\ a^3$ for collecting upon it and imposing one upon another the sheets cut by the cutter C. These grippers are like the grippers commonly used upon the cylinders of printing and other machines carried by shafts $a$, arranged lengthwise of the cylinder in suitable bearings therein. In the example selected for illustration there are three shafts $a$ and sets of grippers. For the purpose of opening the grippers to receive sheets there is secured to the framing A' at one end of the cylinder by a bracket $e$ a stationary cam $f$, Figs. 1* and 2, against which run rollers on the ends of levers $a^*$, provided on the end of the gripper-shafts $a$ outside of the cylinder. The closing of the grippers is effected in a well-known way (illustrated in Fig. 2) by springs $f'$, applied between the other ends of said levers, and eyebolts $f^2$ on the end of the cylinder. For the purpose of opening the grippers to liberate the sheets for deposit on the apon M there is provided just over one edge of the apron a tripping-cam $g$, Fig. 2, under which the rollers of the gripper-shaft levers $a^*$ pass in the revolution of the cylinder. The cam $g$ consists of a projection on a lever $g'$, which works on a fixed fulcrum $g^*$ and which is actuated for the purpose of pulling said cam $g$ into and out of its operative position by a rotary cam $i'$ on a shaft $i$, which is arranged parallel with the cylinder in suitable fixed bearings. The shaft $i$ makes one revolution for every two-thirds of a revolution of the collecting-cylinder B, and hence it places the cam $g$ in operative position three times during every two revolutions of the cylinder, and so each set of grippers is only opened by said cam during every other two-thirds of a revolution of the cylinder. Now as each set of grippers is opened to receive a sheet every time it passes the cam $f$, but is only opened for the liberation of the sheets every other time it passes the cam $g$, it will be understood that two sheets are collected and imposed one upon another on the cylinder by each set of grippers before either sheet is liberated to be deposited upon the apron M, and then both are liberated together to be dropped or deposited imposed one upon the other in a couple on the apron.

In the example of a sheet shown in Fig. 8 the greater dimension represents the full width of the web and is presented to the cylinder B lengthwise of the latter. The said sheet is represented as having eight pages on a side and is to be cut on the lines 20 into four smaller sheets 22, such as are shown in Fig. 9. These smaller sheets are to be folded on the line 21, each of said smaller sheets consisting of four pages, two on a side, and four of said smaller sheets, forming a signature of thirty two pages. The signature is not, however, all made up from one of the larger sheets, but from smaller sheets taken each from one of four different couples of the larger sheets which have been collected and imposed on the cylinder and deposited thereby on the apron M, as hereinafter described, during intermissions in the movement of the endless carrier-rack $n$. The cutter $v\ v'$ is arranged at a distance from the nearest end of the cylinder—that is to say, the right-hand end in Fig. 1—equal to the length of one of the smaller sheets 22 to be cut, and the apron M extends beyond the cylinder nearly to the cutter. The table T extends from the cutter a distance equal to or not less than two lengths of said smaller sheets 22, and the folder F is arranged within the second of said lengths.

The endless toothed rack $n$ of the carrier is carried by two wheels I, one of which runs on a fixed axle $h$, supported in the frame H, containing the slideway in which the straight portions of the rack run, the other of said wheels I running loosely on the shaft M* of the driving-drum M' of the apron M, which shaft is supported, as shown in Figs. 1 and 2, in one bearing M⁵ on the framing A' and another bearing M⁶, carried by one of the brackets H', by which the frame H is attached to the main framing A'. The said rack is driven intermittently or with a step-by-step motion by a spur-gear J on a shaft J', which receives an intermittent motion, as hereinafter described. The grippers $o'\ o^2\ o^3\ o^4\ o^5\ o^6\ o^7$ are in such number and so spaced that there may be two to receive each of as many of the sheets 22 or of the uncut sections 22 of the longer sheets which are to form such shorter sheets as may be at any time situated one before another on the apron M and table T. This makes eight of said grippers, as $o'\ o^2 o^3 o^4$, to be included within the length of the cylinder B— two of them, $o^5$, between the cylinder and cutter and four of them, $o^6\ o^7$, within the length of the table, as will be understood by reference to Figs. 3 and 3*, in the latter of which figures the dotted line 23 indicates the right-hand end of the space above the apron which is occupied by the cylinder. The construction of these grippers is illustrated in Figs. 4, 4*, 5, 6, 7, of which Figs. 4, 4*, 5 are transverse sectional views, Fig. 6 a face view, and Fig. 7 a plan. Each of said grippers consists of two members 24 27, of which one, 24, connected rigidly with the rack, has its end in the form of a three-pronged fork 25 26 26, of which one prong, 25, runs close to the edge of the apron M and to the corresponding edge of the table T and the other two, 26 26, are turned upward to form a stop, against which come the edges of the sheets deposited upon the apron by the collecting-cylinder B. The other member 27 is pivotally connected with the member 24, and a coil-spring 30 is so applied in a well-known manner to the pivotal connection as to exert a constant tendency to close the gripper. The tail of said member 27, extending below the pivotal connection, is furnished with a friction-roller 28, which runs along cams $p$ $q$, located beside the apron.

The cam $p$, which is stationary, is shown in Figs. 4 and 7 and also in Figs. 3 and 3*. It is carried by the rack-frame H and extends along the edge of the apron M from a point opposite the left-hand end of the cylinder a distance a little greater than the length of three of the sheets or sections 22. It has a straight edge, which is simply rounded or beveled, as shown at $p^*$, Figs. 3 and 7, at the end which corresponds with the left-hand end of the cylinder for the purpose of opening the grippers as they pass that end. This cam $p$ holds the grippers open so long as they run along it. The cam $q$, which is shown in Figs. 4 and 7 and also in Fig. 2, is for controlling the closing of the grippers. It consists of a straight bar of a length a little less than that of the sheet or section 22, and it is arranged opposite that portion of the apron M which receives the most forward section 22 of a sheet that may be deposited thereon by the cylinder B. The said cam $q$ is carried by the arms $q'$ of a rock-shaft $q^2$, which is arranged in brackets $q^3$ on the rack-frame H, and this rock-shaft carries another arm $q^4$, which engages, as shown in Fig. 2, with a cam $q^5$ on the rotary shaft $i$, hereinafter described. The said cam $q^5$ serves to throw the cam $q$ toward the apron to a position in which it is operative on the grippers, as shown in Fig. 4*, and back to a position in which it is inoperative thereon, as shown in Fig. 4, as will be hereinafter more fully explained.

Opposite the folding device F there are arranged on the same side of the table T as the carrier two tappets $r$ for the purpose of opening the grippers every time they have brought a pile of superposed and cut sheets 22 to a proper position on the table to be folded into the signature. These tappets, which are shown in plan Fig. 3* and shown on a larger scale in Fig. 5, are carried by a rock-shaft $r'$, which works in bearings in the framing A'. On this rock-shaft is an arm $r^2$, which has connected with it a pushing-spring $r^3$, the lower end of which abuts, as shown in Fig. 5, against a fixed bearing $r^4$, attached to the framing, the said spring serving to hold back the tappets out of range of the rollers 28 of the grippers while the latter are in motion with the rack. For the purpose of giving the tappets $r$ the necessary motion for opening the grippers when the latter have brought the pile of sheets to be folded to a position opposite the folding device, in which position they become stationary opposite said tappets, there is a cam $s'$, Fig. 3*, on an upright rotary shaft $s$, running in bearings in brackets $s^*$, attached to the framing A', the said cam operating on the tappet rock-shaft $r'$ through a yoke-rod $s^2$, which is connected with an arm $r^5$ on said rock-shaft. On the opposite side of the apron to the carrier there are arranged the joggers $t$ for the purpose of jogging the deposited sheets against the stops 26 of the grippers. These joggers are carried by a rock-shaft $t'$, arranged in fixed bearings in the framing A' and operated by any suitable means not necessary to be here described, the said joggers not constituting any part of the present invention.

The cutter $v$ $v'$, hereinbefore mentioned for cutting the sheets, Fig. 8, crosswise on the lines 20, is arranged as nearly as convenient to the apron M. It is represented (see Figs. 1* and 12) as consisting of a stationary lower blade $v'$ and a reciprocating upper blade $v$. The stationary blade $v'$ is carried on a stationary cross-bar E, arranged under the table T, and its upper edge projects upward within a slot $v^3$, provided for it in the table. The reciprocating upper blade is carried by a stock $v^2$, which works in stationary vertical guides $v^6$ on a fixed cross-bar $v^5$. The said stock may have its reciprocating motion given to it by any suitable means—as, for example, those illustrated and fully described in my application Serial No. 124,158 hereinbefore referred to, consisting of two cams $v^4$, Fig. 1*, on two shafts $u$, which are geared together by spur-gears $x$, only one of each of said cams, shafts, and gears being represented in the present case.

The folding device represented, hereinbefore described as a whole by the letter F, is illustrated in Figs. 1* and 3* sufficiently for the purpose of the present invention; the said device being that which is the subject of United States Patent No. 668,393, and which is shown in my said application, Serial No. 124,158. It consists of a blade $y$ and grippers $z$, the said blade being set with its edge downward over a slot $y'$, Figs. 3* and 12, in the table T and the said grippers being carried by a horizontal cross-head $z'$, which has such a vertical reciprocating movement in stationary guides $z^6$ as to carry the points of said grippers upward through the said slot and to withdraw them downward therefrom. The said cross-head and grippers derive the said movement through rods $z^2$ from crank-wrists on disks $z^4$, carried by a horizontal shaft $z^5$, which works in bearings in stands A² erected on the bed-plate A. The said shaft $z^5$ carries also a cam $z^7$ for operating a packer $z^8$; but as this latter does not constitute any part of the present invention no further description of it is necessary.

The web $w$, from which the sheets such as are represented in Fig. 1 are to be cut, may be fed to the cutter at a speed corresponding with that of said cutter in any suitable manner. It is represented (see Fig. 2) as fed by feed-rollers 31 32 and as passing thence to the said cutter over a guide-roller 33. The collecting-cylinder B is at such distance from the cutter that the edge of the web will be taken hold of by the grippers $a'$, $a^2$, or $a^3$ just before each operation of the cutter to sever the sheet from it.

The gear J for driving the endless rack-carrier is represented as carried by a shaft $J'$, running in bearings in a stand $A^3$ on the bed-plate A and a bracket $A^4$ on the framing $A'$, and the said shaft is represented (see Fig. 1*) as deriving its necessary intermittent motion by the mechanical devices known as the "Geneva stop" from a shaft K, which has its bearings in the said stand $A^3$. This device consists of a circular disk $K'$, carried by the said shaft K and carrying a pin 35, which enters successively into each of four radial slots in a disk $J^2$ on the shaft $J'$, the parts of said disk $J^2$ between the slots fitting the periphery of the disk $K'$. This device causes the shaft $J'$ and gear J to make a quarter-revolution for one complete revolution of the shaft K and disk $K'$ and to remain stationary during the succeeding three-quarters of a revolution of the last-mentioned shaft and disk. This movement of the gear J gives quick movements during short intervals of time to the carrier and keeps said carrier stationary during intervening intervals of sufficient length for the deposit of sheets by the collecting-cylinder upon the apron M and for the cutting up of the so-deposited sheets into the smaller sheets 22 and the folding of said smaller sheets into signatures after their arrival on the table T. The said shaft K derives its motion from a shaft L (shown dotted in Fig. 1*) through gears $L'$ and $K^2$ on the said shafts and intermediate gears 36 37, mounted in the stand $A^3$.

The apron M has an intermittent or step-by-step movement corresponding with that of the endless rack-carrier and of the same or not greater surface velocity. The driving-shaft M* of the said apron, which carries its driving-drum $M'$, gets its motion from the driving-shaft $J'$ of the endless carrier through a shaft N, Figs. 1, 1*, and 2, arranged in bearings in brackets $N'$ $N^2$ on one side of the framing $A'$, the said shaft being geared by miter-gears P with said shaft $J'$ and by miter-gears Q with said shaft M*. The said apron may be made of any substantial woven fabric of suitable width. As it is desirable that its upper face, which receives the sheets, should be kept as flat or straight as possible, the bearing 50 for its roller $M^3$ is made adjustable in its supporting-bracket 51 by means of an adjusting-screw 52 for the purpose of setting the apron to the requisite tension.

The driving of the several shafts $b$, $c$, $u$, $i$, $s$, L, $z^5$, and M* at the proper relative speeds may be effected in any suitable manner by properly-proportioned gearing, said gearing being all so proportioned that the cutters C, which cut once during each of their revolutions, make three revolutions to every one of the collecting-cylinder B, while the shaft $i$, with its cams $i'$ and $q^5$, the shaft $z^5$ for operating the cutter-blade $v$, and the shaft K, which operates the carrier, and the apron M all make three revolutions for every two of the collecting-cylinder, the shaft $J'$ and its gear J making one movement for every two-thirds of a revolution of the collecting-cylinder.

I will now briefly summarize the operations of the endless rack-carrier, the apron, the cutter $v\ v'$, and the folding device F. After each deposit of a collection of two sheets by the collecting-cylinder B upon the apron, the latter and the carrier being then both stationary, the carrier and the apron will move a distance equal to the length of one of the short sheets or sections 22, Figs. 8, 9, 10, and again become stationary to receive a collection of two new sheets from the cylinder. In this way the deposits of the sheets in couples upon the apron make upon the apron and table a train such as is illustrated in Figs. 10 and 11, in which the successive deposits numbered 1 2 3 4 in their regular order are each in advance of its successor a distance equal to the length of the shorter sheets 22 to be cut, so that when the first deposit 1 has been carried by the carrier-grippers to the end of the table and over the folder F there will be four deposits within the length of that most-advanced portion $4^a\ 4^b$ of the fourth deposit which corresponds with the length of said shorter sheets. The next movement of the carrier-rack after the fourth deposit carries the superposed portions of the four deposits beyond the cutter $v\ v'$, bringing the line $4^b$ to the latter, which by its previous operations may be supposed to have cut off the advanced sections 22 of the deposits 1, 2, and 3. The cutter-blade $v$ then descends and cuts off the forward sections 22 of the deposits 2, 3, and 4, leaving them piled on the rearmost end of deposit 1. The pile of four deposits, making eight four-page sheets 22, is then carried forward by the next movement of the carrier to the folding device F, which then folds the eight sheets together into a signature of thirty-two pages, which is carried down through the table to the packer or to any suitable receptacle. The same operations of the cutting and folding device occur after every deposit on the apron and every movement of the carrier. In the above-described operation of the carrier its grippers do not operate to seize the sheets until they severally arrive in the position illustrated by the two grippers $o^4$ in Fig. 3*, being up to that time held open successively by the stationary cam $p$ and the movable cam $q$, but as each two arrive opposite the said cam $q$ the said cam is thrown aside from them to permit their being closed by their springs, which keep them closed during the next movement of the carrier. The four superposed couples of sheets are thus all seized together by the carrier-grippers, and so carried forward until said grippers arrive at the position opposite the folding device illustrated by $o^7$ in Fig. 3*, when the tappets $r$ come into operation to produce their opening, as hereinbefore described.

It may be mentioned, though perhaps hardly necessary, that after starting the machinery the sheets 22 cut from the first three deposits, as hereinbefore described, do not make complete signatures, and hence are to be discarded.

It will be readily understood by those skilled in the art how this machinery, though the example represented shows it particularly adapted to the production from two sheets of eight pages of a thirty-two-page signature containing eight sheets of four pages, may be adapted to the production from sheets containing a less or greater number of pages of a signature consisting of a greater or less number of sheets and pages.

What I claim as my invention is—

1. The combination of a traveling sheet-support and a rotary collecting-cylinder for collecting a plurality of sheets one at a time and imposing them one upon another on its periphery and depositing the imposed collections upon said support.

2. The combination of an intermittently-moving sheet-support and a rotary collecting-cylinder for collecting a plurality of sheets one at a time and imposing them one upon another on its periphery and depositing the imposed collection directly therefrom upon said support during the intermissions of its movement.

3. The combination of a traveling sheet-support and means for depositing sheets thereon, a carrier for carrying sheets lengthwise of said support, means for moving said carrier intermittently for the laying of successive deposits of sheets upon said support in a train in which each deposit partly overlaps the preceding one and means for moving the said support in the same direction as the carrier.

4. The combination of an endless apron, a rotary collecting-cylinder furnished with grippers, means for opening and closing said grippers for the reception of sheets and for the deposit thereof on said apron, and means for giving said apron intermittent movements between the successive deposits of sheets thereon whereby the deposited sheets are made to run with said apron in the form of a train in which each deposit partly overlaps the preceding one.

5. The combination of an endless apron, a rotary collecting-cylinder furnished with grippers, means for opening and closing said grippers for collecting a plurality of sheets one at a time and imposing them one upon another on its periphery and depositing the imposed collections upon said apron, and means for giving said apron intermittent movements whereby the deposited collections of sheets are made to run with said apron in the form of a train in which each collection partly overlaps the preceding one.

6. The combination of an endless apron and a stationary table in line therewith constituting together a sheet-support, a carrier for carrying sheets along said apron and table, means for moving said carrier and said apron together intermittently, means for depositing sheets upon said apron during the intermissions of its movement and a cutter located near that end of said table next the apron.

7. The combination of an endless apron and a stationary table in line therewith constituting together a sheet-support, a carrier for carrying sheets along said apron and table, means for moving said apron and carrier together intermittently, means for depositing sheets upon said apron during the intermissions of its movement, a cutter for cutting sheets while partly on said apron and partly on said table into smaller sheets and a folder for folding the so-cut smaller sheets.

8. The combination of an endless apron and a stationary table in line therewith constituting together a sheet-support, means for depositing sheets on said apron, an endless carrier with attached grippers running the whole length of the so-constituted support, a cutter for cutting sheets while retained by said carrier partly on said apron and partly on said table into smaller sheets, and a folder for folding the so-cut smaller sheets.

9. The combination of an endless apron and a stationary table in line therewith constituting together a sheet-support, means for depositing sheets on said apron, an intermittently-moving endless carrier with attached grippers running the whole length of the so-constituted support, a cutter for cutting sheets while retained by said carrier partly on said apron and partly on said table into smaller sheets, a folder operating through an opening in said table for folding the so-cut smaller sheets, means for opening and holding open said grippers for the reception of sheets deposited on the apron, means for closing said grippers for carrying the deposited sheets to the cutter and the cut smaller sheets to the folder and means for reopening said grippers for the release of the sheets on their arrival at the folder.

In testimony that I claim the foregoing as my invention I have signed my name, in presence of two witnesses, this 11th day of December, 1902.

EDGAR H. COTTRELL.

Witnesses:
 FREDK. HAYNES,
 GEORGE BARRY, Jr.